United States Patent Office 3,568,457
Patented Mar. 9, 1971

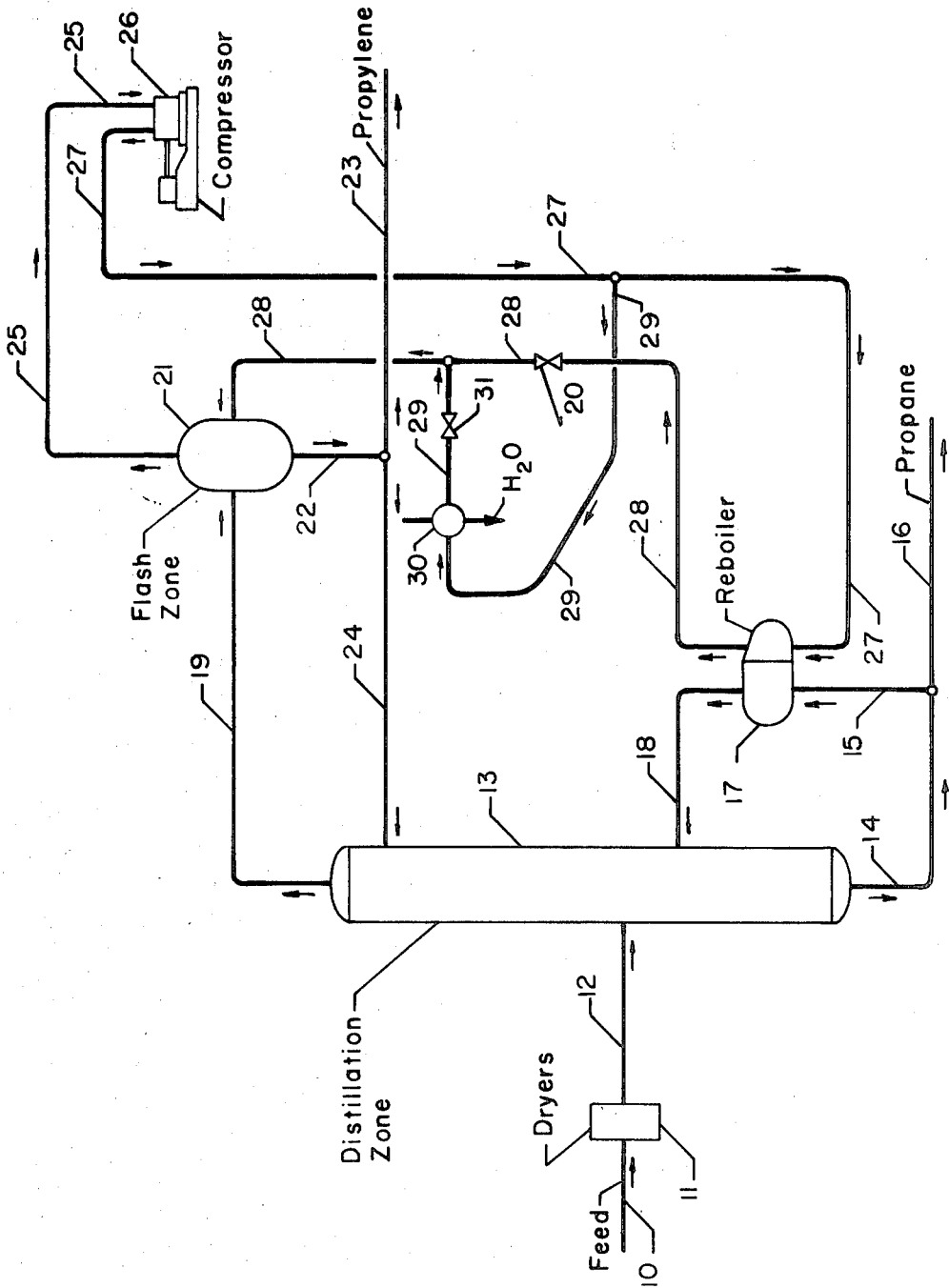

3,568,457
SEPARATION OF PROPANE AND PROPYLENE BY DISTILLATION
Terrence M. Briggs and Valentin H. Segers, Des Plaines, Ill., assignors to Universal Oil Products Company, Des Plaines, Ill.
Filed Mar. 5, 1969, Ser. No. 804,549
Int. Cl. F25j 3/02, C07c 9/00
U.S. Cl. 62—28                    4 Claims

ABSTRACT OF THE DISCLOSURE

Process for separating propane from propylene via fractionation means including the use of a heat pump to supply heat to the fractionator reboiler.

BACKGROUND OF THE INVENTION

This invention relates to a process for separating propane and propylene via fractionation. It specifically relates to a process for utilizing a fractionation zone having associated therewith reboiler means for furnishing the heat for fractionation and the use of a heat pump to supply the heat to the fractionator reboiler.

It is known by those skilled in the art that the demand for propylene as, for example, feedstock to the growing polypropylene industry has increased steadily in recent years. An important source of this basic material is the $C_3$ hydrocarbons produced in the various refining and cracking processes to which petroleum oils are subjected.

Normally, the prior art has separated essentially propane and propylene utilizing fractionation methods. However, since the boiling points of propane and propylene are extremely close, these fractionation colums have become very large thereby increasing considerably the cost of operation, e.g. high cost of utilities due to high reflux ratios, and the capital expense for construction.

Therefore, it would be desirable to devise an improved method for separating propane from propylene via fractionation means in a facile and economical manner.

SUMMARY OF THE INVENTION

It is an object of this invention to provide a process for separating propane and propylene via fractionation means.

Therefore, in accordance with one embodiment of this invention, there is provided a process for separating propylene from propane by fractionation which comprises the steps of: (a) introducing a feed mixture containing propane and propylene into a distillation zone maintained under distillation conditions; (b) removing from said distillation zone a bottoms product comprising essentially propane; (c) reboiling a portion of said bottoms product to supply the heat for fractionation in said zone via indirect heat exchange solely with hereinbelow specified heat transfer medium; (d) removing from said distillation zone an overhead fraction comprising propylene; (e) introducing said overhead fraction and a hereinbelow specified recycle fraction into a flash zone under conditions including a low pressure sufficient to produce a vapor stream and a liquid stream of propylene; (f) compressing said vapor stream to a high pressure sufficient to increase the condensation temperature level of said vapor stream; (g) passing the compressed vapor stream as said specified heat transfer medium into said distillation zone reboiler means for indirect heat exchange with said portion of the bottoms stream of said distillation zone thereby at least partially condensing said compressed vapor stream; (h) withdrawing from said reboiler means the compressed stream and flashing the withdrawn stream to a pressure substantially the same as said low pressure; (i) introducing said flashed stream into said flash zone as the specified recycle stream; and, (j) recovering from said flash zone a liquid stream comprising essentially propylene.

A specific embodiment of this invention includes the proces hereinabove wherein said distillation zone contains at least 50 distillation stages, is maintained under a pressure from atmospheric to 400 p.s.i.g., and said overhead vapor fraction is withdrawn at a temperature from $-54°$ F. to $150°$ F.

In brief, therefore, it can be seen that the present invention provides a facile and economical distillation process which utilizes a heat pump to supply the heat for fractionation. An essential feature of the present invention also utilizes the interrelated and interdependent flash zone which permits the separation of vapor, which can then be compressed, from liquid which can be removed from the system as the propylene product.

DETAILED DESCRIPTION OF THE INVENTION

In operation, a mixture of normally gaseous hydrocarbons composed mainly of $C_2$, $C_3$, and a small amount of $C_4$ hydrocarbons is introduced into treating zone for the removal therefrom of contaminating quantities of acid gases, such as $H_2S$, $CO_2$, carbonyl sulfide, by absorption with, for example, aqueous monoethanolamine. Subsequently, the feed material may be introduced into suitable driers containing, for example, molecular sieves or distillative drier, in order to remove any residual moisture from the feed hydrocarbons. Therefore, the feed to the distillation zone embodies nomally gaseous hydrocarbons which are substantially free of contaminants, such as sulfur compounds and water. In some cases it may be desirable to utilize a deethanizer wherein the $C_2$ and lighter components plus any residual acid gases are removed as an overhead distillate product and the $C_3$ and heavier hydrocarbons are removed as a bottoms product and comprises mainly propane and propylene.

The feed material comprising mainly propane and propylene is now introduced into a distillation zone which may consist of a single distillation column or a plurality of distillation columns containing sufficient contact devices, such as perforated plates, valve trays, or packings, and the like, to promote intimate contact between vapor and liquid for distillation purposes.

An overhead fraction containing primarily propylene together with any residual ethane is withdrawn and introduced in admixture with a hereinafter specified recycle stream into a flash drum which operates to separate vapor from liquid. The vapor fraction separated in the flash drum is passed into compression means under conditions sufficient to significantly increase the condensation temperature level of the vapor stream. Conventionally, the compressing means uses one stage of compression and a compression ratio from 1.2:1 to 4:1, preferably, at about 2:1. The pressure level of the discharge from the compression means should be at least 20 p.s.i.g. higher than the pressure maintained in the previous flash drum and, preferably, is maintained from 50 to 100 pounds higher than the low pressure maintained in the flash drum.

According to an essential feature of this invention, the compressed vapors are passed in indirect heat exchange with the bottoms material from the distillation column under conditions sufficient to transfer enough of the latent heat content of the vapor stream to the bottoms material being reboiled in order to supply the heat for fractionation as specified. Generally, under these reboiler conditions the compressed or relatively high pressure vapor is totally condensed. The condensed high pressure material is now flashed by passage through a pressure reducing device thereby creating a mixture of vapor and liquid which is at equilibrium under the temperature and pressure conditions of the flash drum. The flashed stream is returned as the specified recycle stream directly to the previously mentioned flash drum. This flashed material may be returned either separately or in physical admixture with the total overhead fraction from the fractionation zone also being introduced into this flash drum.

The liquid which has been produced in the flash drum is withdrawn, preferably, by pumping means and a portion or all of it is returned to the distillation zone as reflux thereon. The remaining liquid portion, if any, can be withdrawn from the flash drum and sent to storage.

The design of the compression equipment necessary for the practice of this invention is well known to those skilled in the art. The heat pump or thermocompressor can be electrically or steam driven. Centrifugal, axial flow, etc. compressors are also well suited for this service.

Additionally, the distillation trays used in the distillation column or columns necessary in the practice of this invention should be preferably of the low pressure drop type. Typically, the tray pressure drop should be below 1½ inches of water since the power requirement of the compressing apparatus is directly related to the pressure drop through the column. It is apparent that a distillation column containing perhaps from 100 to 200 distillation trays will have appreciable pressure drop if care is not taken in the design of the trays.

The invention may be more fully understood with reference to the attached drawing which is a schematic representation of apparatus for practicing the preferred embodiment of the invention.

DETAILED DESCRIPTION OF THE DRAWING

The invention will now be described with reference to the drawing and applied for illustrative purposes to a commercial size fractionating system for recovering high purity propylene from a propylene-propane system.

Referring now to the drawing, a mixture of normally gaseous hydrocarbons containing on a mol basis 11.9 mols per hour of ethane, 971.3 mols per hour of propylene, 311.7 mols per hour of propane, and 41.3 mols per hour of butane is introduced into the system via line 10, passed through molecular sieve driers 11 for the removal of residual moisture, and the dried mixture introduced into distillation zone 13 via line 12.

Distillation zone 13 for illustrative purposes is a single distillation column containing about 110 valve type distillation trays. The feed mixture is introduced into the column at a level of about tray 58 as measured from the top of the column. Suitable operating conditions are maintained in the column to keep a top temperature of about 58° F. and a column bottoms temperature of about 81° F. Suitable low pressure is maintained in the fractionation column to create a top pressure of about 115 p.s.i.g. and a bottoms pressure of about 123 p.s.i.g. Under these conditions a bottoms stream containing 19.4 mols per hour of propylene, 275.5 mols per hour of propane, and 41.3 mols per hour of butane is withdrawn from the system as a net product via lines 14 and 16. Sufficient bottoms recycle, however, is maintained by passing a portion of the bottoms product via line 15 into reboiler means 17 which is heated by hereinbelow specified heat exchange medium being introduced into reboiler 17 via lines 27 and withdrawn via line 28. The vaporized bottoms product stream containing heat for fractionation is withdrawn from reboiler 17 via line 18 and reintroduced into distillation column 13 at the lower portion thereof.

An overhead vapor fraction containing ethane, propylene, and propane is withdrawn from distillation column 13 via line 19 and introduced into flash zone 21 at a temperature of 58° F. and a pressure of 114 p.s.i.g. By means more fully developed hereinbelow, another vapor stream comprising 446.4 mols per hour of ethane, 12,808 mols per hour of propylene, and 439.6 mols per hour of propane is withdrawn from flash zone 21 and passed into compressor 26 via line 25 which is a single stage machine operating on a compression ratio of 2.04. The suction pressure into compressor 26 is 113 p.s.i.g. and the compressed vapor stream is withdrawn via line 27 at a pressure of 246 p.s.i.g. The compression of the vapor stream has now increased the temperature of the vapor stream from about 58° F. to about 127° F. A portion of the compressed material is passed via line 29 and condenser means 30, pressure reducing device 31, into admixture with the flashed stream returning from the reboiler, more fully discussed hereinafter. The remaining compressed material is passed via line 27 into reboiler 17 wherein its latent heat plus some reusable heat is indirectly transferred to the bottoms material being introduced into reboiler 17 from line 15. The transfer of the heat from the compressed vapor to the reboil liquid at least partially condenses the vapor material in line 27 and more typically completely condenses the material in line 27. Accordingly, a liquid stream representing the condensed compressed material is withdrawn from reboiler 17 at a pressure of about 244 p.s.i.g. via line 28 and passed through pressure reducing valve 20 which drops the pressure from 244 p.s.i.g. to substantially the same pressure maintained in flash zone 21, to wit: about 114 p.s.i.g. After passage through pressure reducing valve 20, the material comprises primarily 2406 mols per hour of vapor and 9024 mols per hour of liquid. This mixture of vapor and liquid is now introduced via line 28 into flash zone 21 in the manner previously discussed.

The liquid which is accumulated in flash zone 21 is now withdrawn via line 22 by pumping means not shown and passed in part via line 24 into distillation column 13 as reflux thereon. A net product stream comprising 11.9 mols per hour of ethane, 951.9 mols per hour of propylene and 36.2 mols per hour of propane is also withdrawn from flash zone 21 as a liquid and passed out of the system via line 23, preferably, to storage. Alternatively, a net product stream of propylene can be withdrawn by means not shown from the condensed material in line 29, previously mentioned.

The invention claimed:
1. Process for separating propylene from propane by fractionation which comprises the steps of:
  (a) introducing a feed mixture containing propane and propylene into a distillation zone maintained under distillation conditions;
  (b) removing from said distillation zone a bottoms product comprising essentially propane;
  (c) reboiling a portion of said bottoms product to supply the heat for fractionation in said zone via indirect heat exchange solely with hereinbelow specified heat transfer medium;
  (d) removing from said distillation zone an overhead fraction comprising propylene;
  (e) introducing said overhead fraction and a hereinbelow specified recycle fraction into a flash-phase separation zone under conditions including a low pressure sufficient to produce therein a vapor phase and a liquid phase of propylene and withdrawing from said flash-phase separation zone a corresponding vapor stream and a liquid stream of propylene;
  (f) compressing said vapor stream to a high pressure at least 20 p.s.i.g. higher than said low pressure and sufficient to increase the condensation temperature level of said vapor stream;
  (g) passing the compressed vapor stream as said specified heat transfer medium into said distillation zone reboiler means for indirect heat exchange with said portion of the bottoms stream of said distillation zone thereby at least partially condensing said compressed vapor stream;
  (h) withdrawing from said reboiler means the compressed stream, and flashing the total amount of the withdrawn stream to a pressure substantially the same as said low pressure;

(i) introducing said flashed stream comprising a vapor-liquid mixture directly into said flash-phase separation zone as the specified recycle fraction; and, (j) returning a portion of said liquid propylene stream as reflux to the upper portion of said distillation zone, and recovering the remaining portion of said liquid propylene stream as net overhead product.

2. Process according to claim 1 wherein said distillation zone contains at least 50 distillation stages, is maintained under a pressure from atmospheric to 400 p.s.i.g., and said overhead vapor fraction is withdrawn at a temperature from $-54°$ F. to $150°$ F.

3. Process according to claim 1 wherein said low pressure is from 65 p.s.i.g. to 150 p.s.i.g., and said vapor stream is compressed with one stage of compression and a compression ratio of from 1.2:1 to 4:1.

4. Process according to claim 1 wherein a portion of said compressed vapor stream is condensed by condensing means separate from said reboiler means, the resulting condensate is flashed to a pressure substantially the same as said low pressure, and the flashed condensate is introduced into said flash-phase separation zone together with said recycle fraction.

References Cited

UNITED STATES PATENTS

| | | | |
|---|---|---|---|
| 2,619,814 | 12/1952 | Kniel | 203—26 |
| 3,414,484 | 12/1968 | Carson et al. | 62—31 |
| 3,418,215 | 12/1968 | Nirenberg | 203—26 |

FOREIGN PATENTS

| | | | |
|---|---|---|---|
| 659,886 | 3/1963 | Canada | 62—26 |
| 667,832 | 7/1963 | Canada | 203—26 |

WILBUR L. BASCOMB, JR., Primary Examiner

U.S. Cl. X.R.

62—26, 31; 203—26, 77; 260—676, 677